United States Patent
Shan (10) Patent No.: US 7,921,025 B2
(45) Date of Patent: Apr. 5, 2011

(54) BUILDING MARKET MODELS FOR PLURAL MARKET PARTICIPANTS

(75) Inventor: Jerry Z. Shan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 576 days.

(21) Appl. No.: 11/879,977

(22) Filed: Jul. 19, 2007

(65) Prior Publication Data

US 2009/0024445 A1 Jan. 22, 2009

(51) Int. Cl.
*G06F 17/00* (2006.01)
(52) U.S. Cl. .......................................................... 705/7
(58) Field of Classification Search ..................... 705/10
See application file for complete search history.

(56) References Cited

U.S. PATENT DOCUMENTS

| | | | |
|---|---|---|---|
| 6,044,357 A | 3/2000 | Garg | |
| 7,072,848 B2* | 7/2006 | Boyd et al. | 705/10 |
| 7,133,848 B2* | 11/2006 | Phillips et al. | 705/10 |
| 7,302,410 B1* | 11/2007 | Venkatraman et al. | 705/35 |
| 2005/0283354 A1 | 12/2005 | Ouimet | |
| 2006/0015380 A1* | 1/2006 | Flinn et al. | 705/7 |
| 2006/0095306 A1 | 5/2006 | Parker et al. | |

OTHER PUBLICATIONS

No author; Everest Report Shows How Hewitt/Exult Combo Changes Global HR Outsourcing; Aug. 6, 2004; Business Wire; 2 pages.*
Y. So et al., "Multinomial Logit Models," pp. 467-481 (1995).
Wikipedia definition for "Multinomial logit," http://en.wikipedia.org/wiki/Multinomial_logit, pp. 1-2 (at least as early as May 16, 2007).

* cited by examiner

*Primary Examiner* — Thomas Dixon (57) ABSTRACT

A trend of attributes associated with plural market participants is determined. A representation of the trend is computed, and market models for the market participants are built according to the representation of the trend.

22 Claims, 4 Drawing Sheets

BUILDING MARKET MODELS FOR PLURAL MARKET PARTICIPANTS

BACKGROUND

Market share and market size analysis is often performed to allow analysts to better understand effectiveness of various operations (e.g., promotional operations, advertising campaigns, pricing campaigns, etc.) of an enterprise (e.g., business, educational organization, government agency), to detect systematic changes in an enterprise, to determine whether particular products are competing effectively with products of competitors, and to make forecasts with respect to existing products or future products.

Many conventional modeling approaches for performing market share or market size analysis, such as discrete choice modeling approaches, use the assumption that attributes (such as a price attribute) do not exhibit a trend change. That assumption may not be valid, since in many competitive markets, product prices can continually decline while capabilities of products are continually being enhanced.

BRIEF DESCRIPTION OF THE DRAWINGS

Some embodiments of the invention are described with respect to the following figures.

DETAILED DESCRIPTION

In accordance with some embodiments, a technique is provided to enable the building of a market share model and/or a market size model according to various attributes associated with choices representing market participants. As used herein, a "market model" can refer to either or both of a market share model or a market size model. One example attribute is a price attribute. Examples of other attributes include product features, product availability locations, product capabilities, product capacities, and so forth. A "market participant" refers to an entity that can be chosen by a consumer of goods or services. One example of a market participant is a product that consumers can purchase. Thus, in a competitive market multiple products may be offered by various competing enterprises (e.g., businesses, educational organizations, government agencies), from which the consumer can make a choice when purchasing. Another example of a market participant is a service that can be offered by an enterprise. A market participant can also refer to the enterprise itself. Thus, in this latter example, a market can include several competing enterprises that sell competing products and/or services (e.g., commercial products and/or services, educational offerings, government services, etc.).

Market share models are used to perform an analysis of market shares (expressed as percentages) of competing participants. Market size models are used to perform an analysis of market sizes (expressed in terms of amount, such as total revenue, total profit, etc., of each market participant) of competing market participants. A market size model refers to a model that represents market demand (expressed in terms of units of a good or service, revenue, etc.) for the market participant. Market share and/or market size models can also be used by analysts to perform forecasting for existing products or for future products.

To provide more accurate market models (market share models and/or market size models), trends of underlying attributes are considered when building the market share models and/or market size models. A "trend" in an attribute refers to some tendency of values of the attribute to increase, decrease, or stay constant. A trend of the attribute can change, which means that attribute values can exhibit differing trends in different time intervals. In other words, a trend can change over time.

One example of a trend is a change in price over time. With consumer electronic products, for example, price may decline over the life of each of the products. Also, another characteristic of consumer electronic products is that capacities and capabilities of such products tend to increase while prices decrease. Personal computers provide a good example of this changing trend, where the prices of personal computers that are introduced into the market decrease over the life cycles of the computers while processor speeds and memory capacities of the computers increase. Another example of electronic products that exhibit pricing declines with increasing capacities are storage products, such as memory chips, hard disk drives, flash memory devices, and so forth.

By taking into account the trend (or change in trend) of one or more attributes associated with various choices (representing market participants) that are available in a market allows for the building of more accurate market share models and/or market size models. Note that market share and/or market size models can be built for both individual market participants and the overall market in the environment of attribute(s) exhibiting trend change.

Figure 1:
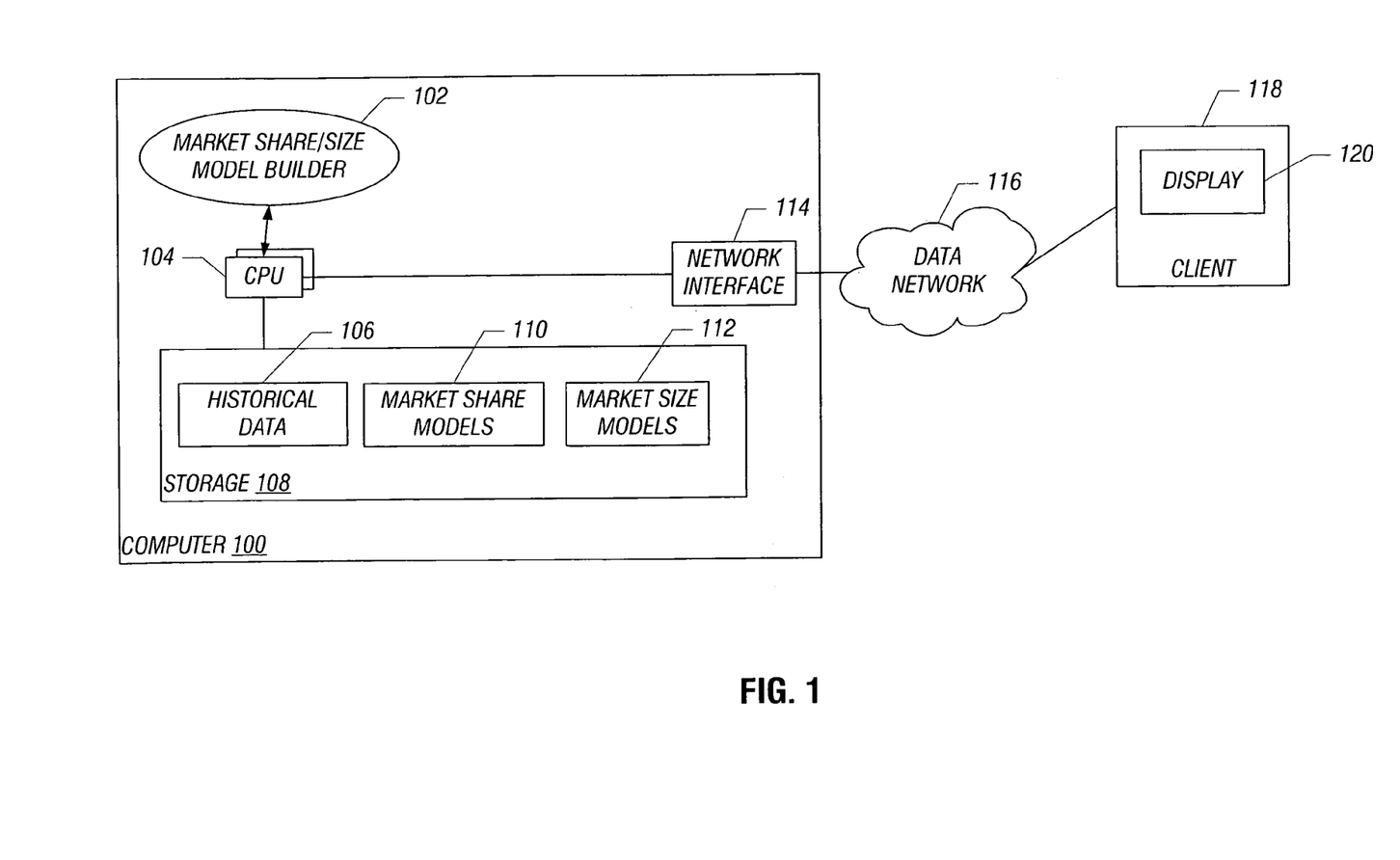
FIG. 1 is a block diagram of an example arrangement including a computer that incorporates software executable to perform market size and/or market share modeling, according to some embodiments.

FIG. 1 shows an example computer 100 that includes a market share/size model builder 102 for building a market share model and/or a market size model, in accordance with some embodiments. The market share/size model builder 102 can be a software module executable on one or more central processing units (CPUs) 104. As input, the market share/size model builder 102 receives historical data 106 stored in a storage 108, where the historical data 106 provides information such as historical price information for market participants, historical capacity/capability information for market participants, market share information for the market participants, and market size information for the market participants. Based on the historical data, the market share/size model builder 102 builds various market share models 110 and/or market size models 112, which can be stored in the storage 108.

The market share and/or market size models 110 and/or 112 can also be communicated by the computer 100 to a remote location, such as through a network interface 114 of the computer 100 and over a data network 116 to a client computer 118. The market share and/or market size models can be presented for display in a display 120 of the client computer 118, or a report (e.g., a chart, graph, table, etc.) can be generated based on the market share and/or market size models for presentation in the display 120. Alternatively, a display device can be directly attached to the computer 100 to allow for presentation of the market share and/or market size models, or for presentation of reports produced based on the market share and/or market size models.

Details of performing market share and/or market size modeling, in accordance with some embodiments are described below.

Suppose there are K+1 choices (representing market participants) of a particular type of product (e.g., memory chip, computer, etc.) from which a consumer can choose. One of the choices is defined as the base or the reference choice, and the other K choices are defined as the alternative choices. For each choice, its product demand (in terms of market share) is modeled as $p_k$ (k=0, 1, 2, ..., K), where $p_k$ is a percentage value. A set of observable attributes is used in deriving the model $p_k$ for each choice. For each model (associated with a corresponding choice), there can be in general M (M≧1) explanatory (or dependent) variables $x_1, x_2, \ldots, x_M$ (representing corresponding attributes), not counting the additional intercept term (referred to as $x_0$). The model for each choice in the abstract can be expressed as $p_k = f_k(\vec{x})$, where $f_k(\vec{x})$ is a function based on a vector $\vec{x}$ that contains explanatory variables.

In one implementation, product prices are considered the drivers for market share so that the price attributes of all the K+1 competing choices are used as explanatory variables. An attribute is considered a driver for market share if the attribute affects the market share. Therefore, M=K+1, and $\vec{x}$=(itc, $x_0$, $x_1, x_2, \ldots, x_K$), where itc is the intercept term and is equal the value "1" in one example, and $x_0, x_1, \ldots, x_K$ are the price attributes of corresponding choices 0, 1, 2, ..., K (in other words, $x_0$ is the price attribute for choice 0, $x_1$ is the price attribute for choice 1, and so forth). The intercept term itc measures the combined effect of all of the explanatory or independent variables when they take the value of zero in the response or dependent variable. The order of choices does not matter, and they can be labeled by the corresponding indexes for the market share model $p_k$ (k=0, 1, 2, ..., K). In some embodiments, the objective for demand modeling is to find the best $f_k(\vec{x})$ for all the choices.

If other attributes are also key drivers for the product demand, they can also be included in the explanatory variables vector, $\vec{x}$. Thus, for example, if there are two attributes that are drivers for product demand among K+1 choices, then the explanatory variables list $\vec{x}$ can be expressed as (itc, $x_0$, $x_1, \ldots, x_K, x_{K+1}, \ldots, x_{2K+1}$), where $x_{K+1}$ to $x_{2K+1}$ are the variables for the second attribute. More generally, if N attributes (or drivers) are considered for K+1 choices, then the total number of explanatory variables in $\vec{x}$, including the intercept term, is N*(K+1)+1.

The following describes modeling approaches and steps for building market share models and market size models, both for cases where there is no trend change for product prices (or other attributes), and where there is trend change for product prices (or other attributes).

The market share models are expressed with the following mathematical constructs. K coefficient vectors $\vec{\beta}_k$ (k=1, 2, ..., K) are provided, where each $\vec{\beta}_k$ coefficient vector corresponds to a respective one of the alternative choices 1 to K. Note that a $\vec{\beta}_k$ coefficient vector is not defined for the base choice (k=0). Each $\vec{\beta}_k$ is a vector of 1+(K+1)=K+2 components, where the first component is for the intercept term, and the other K+1 components are for the K+1 choices. The elements of the $\vec{\beta}_k$ coefficient vector includes $\beta_k(itc)$, $\beta_k(0)$, $\beta_k(1)$, up to $\beta_k(K)$. The coefficient $\beta_k(0)$ represents the relative market share of choice k to choice 0 if all choices set their attribute value (e.g., price) to zero. The coefficient $\beta_k(1)$ represents the net effect of unit price change of choice 1 (while the prices of other choices remain fixed) on the relative market share of choice k to choice 0. The other coefficients $\beta_k(j)$, j=1 to K, have similar interpretations.

A model $p_0$ represents the model for the base or reference choice, while model $p_k$ represents the model for choice k (k=1 to K). Models $p_0$ and $p_k$ are defined in Eq. 1 below:

$$\begin{cases} p_0 = f_0(\vec{x}) = \dfrac{1}{1 + \sum_{j=1}^{K} \exp(\vec{\beta}'_j \vec{x})}, \\ p_k = f_k(\vec{x}) = \dfrac{\exp(\vec{\beta}'_k \vec{x})}{1 + \sum_{j=1}^{K} \exp(\vec{\beta}'_j \vec{x})} \text{ (for } k = 1, \ldots, K). \end{cases} \quad \text{(Eq. 1)}$$

Eq. 1 provides multilogit demand models. In other embodiments, other types of market share models can be used. In Eq. 1, $\vec{\beta}'_k$ represents the transpose of $\vec{\beta}_k$, and $\vec{\beta}'_k \vec{x}$ is the inner product of vectors $\vec{\beta}_k$ and $\vec{x}$. Each component of a $\vec{\beta}_k$ vector represents a market share coefficient that is to be multiplied with a corresponding attribute on $\vec{x}$. If the attribute considered for building the market share models $p_0, p_1, \ldots, p_K$ is the price attribute, then $\vec{x}$ contains the K+1 prices for the K+1 choices.

From the historical data 106 (FIG. 1), the prices of $\vec{x}$ are known, and $p_0, p_1, \ldots, p_K$ are known. Also, from the historical data, the market share coefficients in the $\vec{\beta}_j$ vectors can be calculated for subsequent use. Once the $\vec{\beta}_j$ vectors are computed based on historical data, the market share models of Eq. 1 can be used to determine $p_0, p_1, \ldots, p_K$ for other $\vec{x}$ values.

The above describes definitions of market share models according to one embodiment. The following describes definitions for market size (demand) models, denoted by $D_j$ (j=0, 1, ..., K), which represent the total unit demands for the reference choice and the other K choices, respectively. $D=D_0+D_1+\ldots+D_K$ is the total market size, which is to be also modeled.

In one embodiment, if a multinomial logit model framework is used, the following relationship can be derived for j=1, 2, ..., K:

$$\frac{D_j}{D_0} = \exp(\vec{\beta}'_j \vec{x}). \quad \text{(Eq. 2)}$$

According to Eq. 2, it suffices to model $D_0$, since Eq. 2 allows the other models $D_j$ (j=1 to K) to be readily derived once $D_0$ is known. In one embodiment, a log-linear model that correlates the unit demand for the reference choice (choice 0) with the available attributes set $\vec{x}$ is used. This set $\vec{x}$ can be the price attribute set of all the pertinent K+1 competing choices, similar to $\vec{x}$ discussed above for the market share models. The log-linear model for $D_0$ is expressed as $$\log(D_0) = \gamma_{itc} + \gamma_0 x_0 + \ldots + \gamma_K x_K = \vec{\gamma}\,' \vec{x}. \quad \text{(Eq. 3)}$$

In Eq. 3, $\gamma_{itc}, \gamma_0, \gamma_1, \ldots, \gamma_K$ represent the market size (demand) coefficients that are to be multiplied with respective price attributes itc (which is the intercept term equal to one), $x_0, x_1, \ldots, x_K$. The market size coefficient $\gamma_1$ represents the effect on demand for choice 0 in response to unit price change for choice 1 while assuming the prices for other choices remain fixed; market size coefficient $\gamma_2$ represents the effect on demand for choice 0 in response to unit price change for choice 2 while assuming the prices for other choices remain fixed; and so forth. Equivalently, $$D_0 = \exp(\gamma_{itc} + \gamma_0 x_0 + \ldots + \gamma_K x_K) = \exp(\vec{\gamma}\,' \vec{x}). \quad \text{(Eq. 4)}$$

The model for the total market size D then is $$\begin{aligned}
D &= D_0 + D_1 + \ldots + D_K \quad &\text{(Eq. 5)} \\
&= D_0 + \sum_{j=1}^{K} (\exp(\vec{\beta}_j\,' \vec{x})) D_0 \\
&= D_0 \left(1 + \sum_{j=1}^{K} \exp(\vec{\beta}_j\,' \vec{x})\right) \\
&= \exp(\vec{\gamma}\,' \vec{x}) \left(1 + \sum_{j=1}^{K} \exp(\vec{\beta}_j\,' \vec{x})\right).
\end{aligned}$$

Note the parameter vector $\vec{\gamma} = (\gamma_{itc}, \gamma_0, \gamma_1, \ldots, \gamma_K)$ for the market size model is also of length K+2, the same as each of the $\vec{\beta}_k$ parameter vectors for the market share models, if the intercept term is included in the market size model. Alternatively, the intercept term can be excluded in the market size model, and in that case, $\vec{\gamma} = (\gamma_0, \gamma_1, \ldots, \gamma_K)$ is of length K+1, instead of the same length as each of $\vec{\beta}_k$. In other embodiments, other types of market size model definitions can be used.

Figure 3:
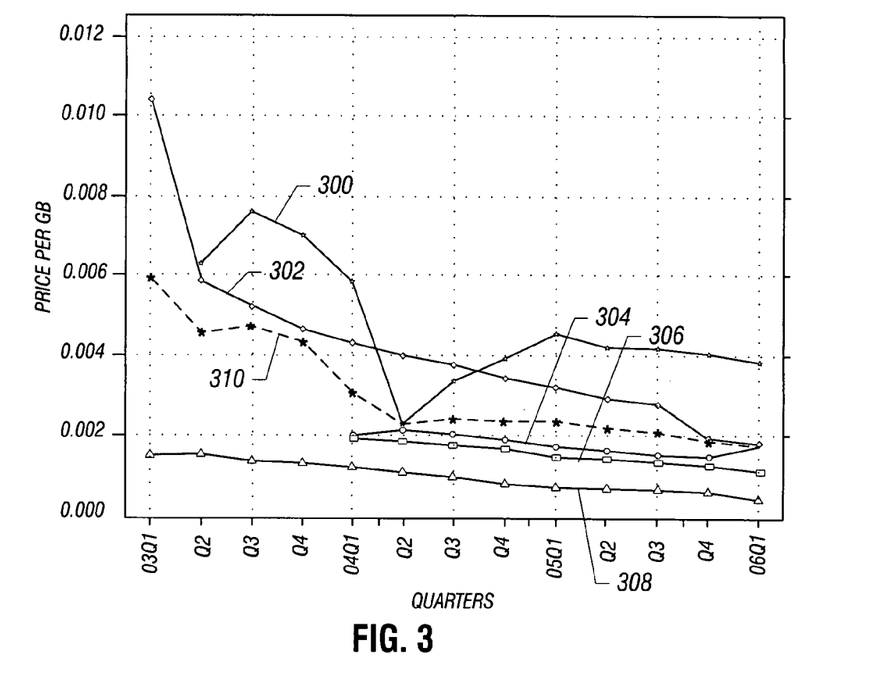
FIG. 3 is a graph that illustrates prices of multiple choices that are available in a market, with the graph also depicting a trend curve to indicate the trend of the prices associated with the various choices, according to an embodiment.

The above describes the building of market share and market size models when it is assumed that there is no change in the trend of the underlying attributes, such as price attributes, that are considered the drivers for the models. However, it is noted that in many cases the assumption of no trend change for the underlying attributes is not accurate. FIG. 3 shows an example of a changing trend in price attributes. The market participant (choice) in the example of FIG. 3 is a storage device. The price attribute for storage devices offered by different companies can be expressed in terms of price per gigabyte (GB). In FIG. 3, the vertical axis represents price per GB, and the horizontal axis represents time (which in the example of FIG. 3 is in terms of quarters). A first curve 300 illustrates price per GB variations as a function of time for a first market participant (e.g., storage device offered by a first company). Other curves 302, 304, 306, and 308 represent storage device offerings provided by other companies. Note that the price variations are different for different companies, in the example of FIG. 3. A curve 310 represents an overall trend that is based on the median (or other aggregate such as mean) of the prices per GB for the five different curves 300, 302, 304, 306, and 308. In accordance with some embodiments, the trend, such as the trend represented by the curve 310, can be used to produce more accurate market share and/or market size models.

Figure 2:
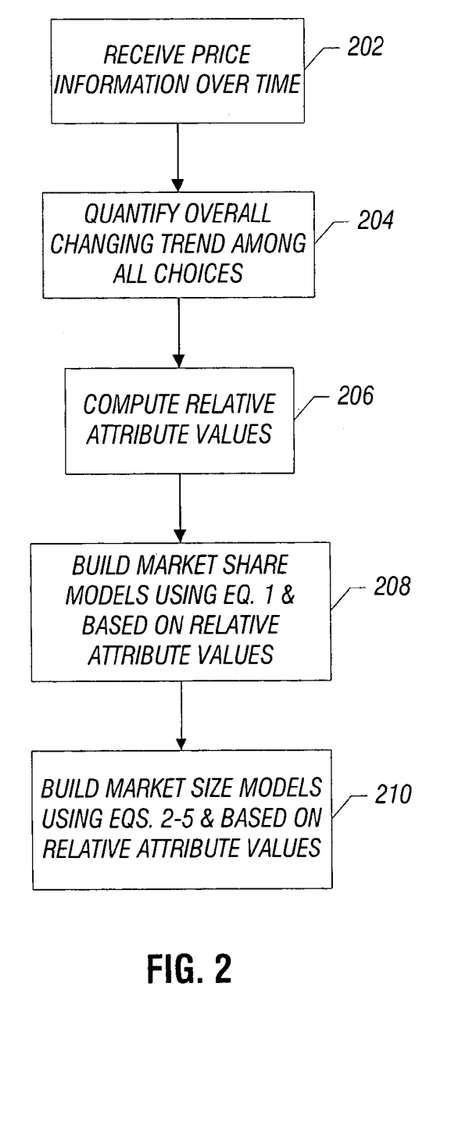
FIG. 2 is a flow diagram of a process of performing market size and/or market share modeling, according to an embodiment.

FIG. 2 illustrates a process of building market share and market size models that account for the trend of underlying attributes that are drivers for the models. The process of FIG. 2 can be performed by the market share/size model builder 102 of FIG. 1. The market share/size model builder 102 first receives (at 202) price information (and/or information of other attributes) over time, which can be from the historical data 106 stored in the storage 108 of FIG. 1. The price information over time is expressed as $Pr_k(t)$. Note that $Pr_k(t)$ can represent the actual price for choice k at time t, or alternatively, $Pr_k(t)$ can represent the log of the price for choice k at time t. In the example of FIG. 3, the $Pr_k(t)$ attribute can represent price per GB.

Next, the market share/size model builder 102 quantifies (determines) (at 204) the overall changing trend among all the choices. In one embodiment, the quantifying is based on taking the median of all $Pr_k(t)$ for the multiple choices (such as taking the median of the prices represented by curves 300, 302, 304, 306, and 308 of FIG. 3). The median of all $Pr_k(t)$, k=1, 2, ..., K+1, produces a trend curve represented as M(t) (e.g., 310 in FIG. 3).

Note that in a different implementation, instead of using the median of all $Pr_k(t)$, some other aggregate function can be performed, such as taking the mean or some other aggregation.

Next, the market share/size model builder 102 computes (at 206) the relative attribute values, which in this case are the relative prices among the multiple choices. Obtaining the relative price for each choice basically is a normalization of the price with respect to the trend M(t). In one implementation, the relative price for each choice k is as follows:

$$R_k(t) = 1 + (Pr_k(t) - M(t))/M(t) : k = 1, 2, \ldots, K+1 \quad \text{(Eq. 6)}$$

Figure 4:
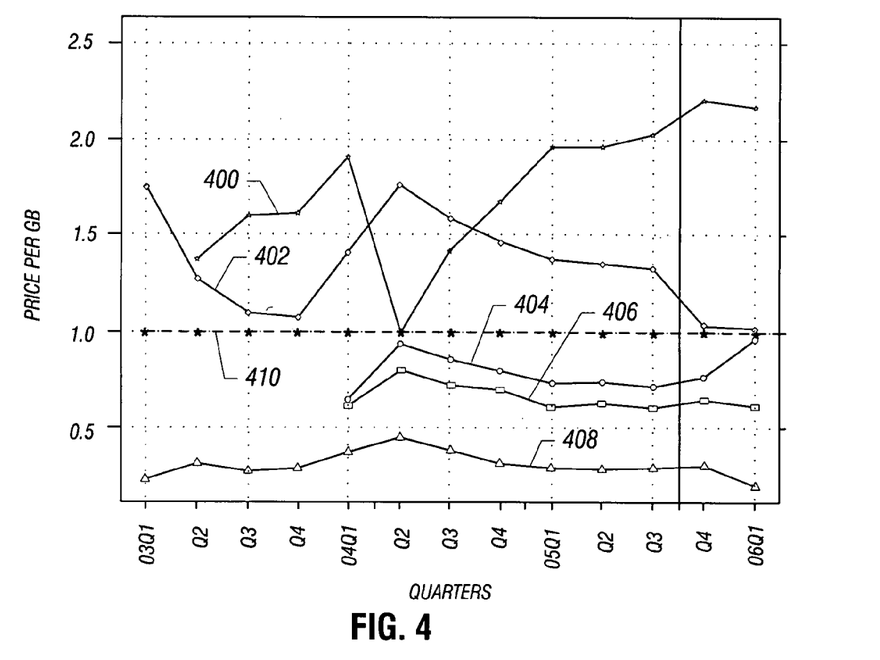
FIG. 4 is a graph that illustrates relative prices normalized to the trend curve, according to an embodiment.

In Eq. 6 above, the addition of the value 1 (or another suitable constant value) is to avoid negative values in the relative prices, which are to be used in the building of models described below. FIG. 4 illustrates a graph of the normalized or relative prices per GB computed according to Eq. 6. Curves 400, 402, 404, 406, and 408 in FIG. 4 represent relative prices per GB for offerings from five different companies (based on the prices of curves 300, 302, 304, 306, and 308, respectively). Note that in FIG. 4, a trend curve 410 is actually a flat line (horizontal line) having value 1.0 due to the fact that the trend curve 310 of FIG. 3 has been normalized with respect to itself.

Next, as depicted in FIG. 2, the market share/size model builder 102 builds (at 208) market share models ($p_0, p_1, \ldots, p_K$) using Eq. 1 above for each of the choices, based on the relative attribute values calculated according to Eq. 6. The relative attribute values are used in place of the original attribute values of $\vec{x}$. In other words, instead of using original $\vec{x}$ containing the original attribute values in Eq. 1, modified $\vec{x}$ containing the relative attribute values are used. Note also that modified $\vec{x}$ containing the relative attribute values also varies as a function of time such that a time dependency is also introduced into Eq. 1, such that the models can be expressed as $p_0(t), p_1(t), \ldots, p_K(t)$ since $\vec{x}$ is a function of t.

Similarly, the market share/size model builder 102 builds (at 210) market size models using Eqs. 2-5 above, and based on the relative attribute values instead of the original attribute values in $\vec{x}$. Eq. 4 can be used to produce the market size model $D_0$ for the reference choice, while Eq. 2 is used to produce the market size models $D_j$ (j=1, 2, ..., K) for the alternative choices. Eq. 5 is used to produce the model D for the total market size. The market size models can also be expressed as functions of time t: $D_0(t), \ldots, D_j(t), \ldots, D(t)$, since modified $\vec{x}$ is a function of t.

Figure 5:
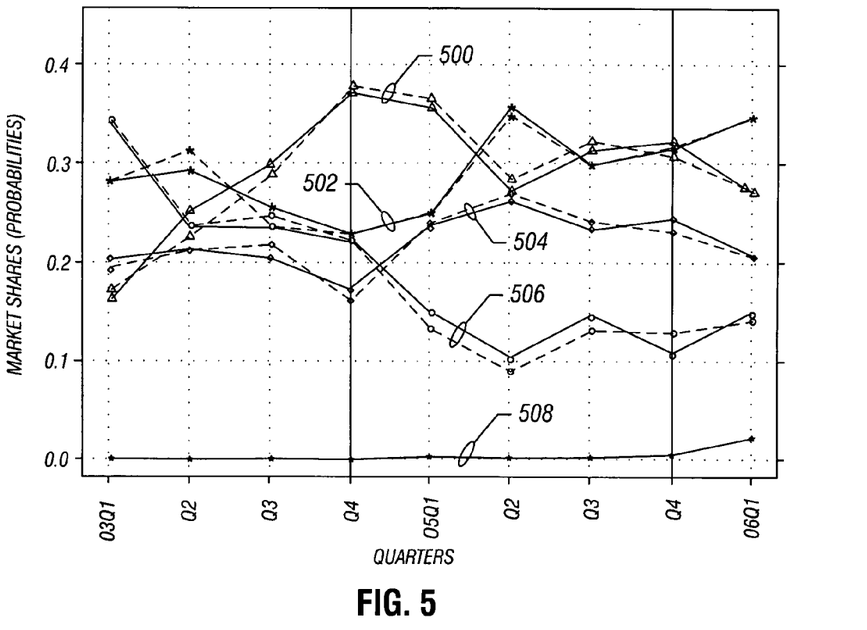
FIG. 5 is a graph that illustrates the goodness of fit between observed market share values and market share values computed using market share models built using a technique according to an embodiment.

FIG. 5 illustrates market shares over time for the different market participants, where solid lines represent observed values, while dashed lines represent the corresponding computed values generated using corresponding market share models. Five pairs (500, 502, 504, 506, and 508) of curves are depicted in FIG. 5, where each pair shows the observed market share curve and the computed market share curve of a corresponding market participant. The closeness of the curves in each pair indicates that a relatively good fit has been achieved, which means that the market share models are relatively accurate.

Figure 6:
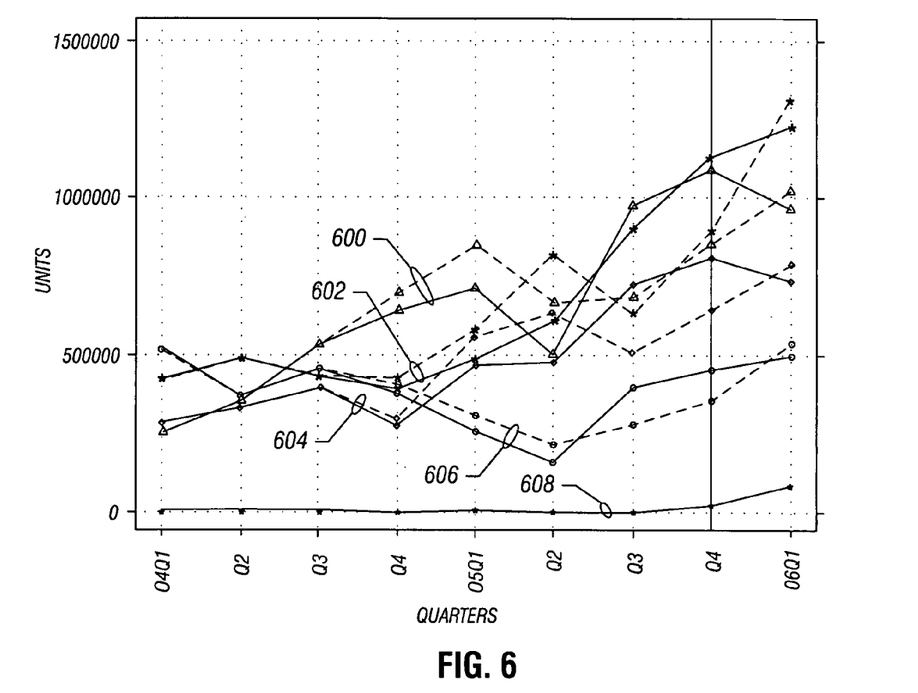
FIG. 6 is a graph that illustrates the goodness of fit between observed market sizes for various choices and market sizes computed using market size models built using a technique according to an embodiment.

FIG. 6 shows market sizes (in terms of units of demand) over time. FIG. 6 also shows five pairs (600, 602, 604, 606, and 608) of curves representing market sizes, where the solid line in each pair represents the observed market size values, and the dashed line in each pair represents the computed market size values based on the corresponding market size model. As depicted in FIG. 6, the observed market size curves and computed market size curves in each pair are also relatively close to each other to indicate a relatively good fit. This indicates that the market size models are also relatively accurate.

Taking into account changing trends in producing market share and/or market size models, various additional insights can be provided that may not be provided by conventional techniques that do not account for trend. These additional insights provide a better understanding of market dynamics in an environment of changing prices and/or other changing product attributes. Examples of insights that can be gained include understanding the effect of changing one company's product price on the market shares of all competing companies, and understanding various price elasticity and sensitivity measures with respect to other product attributes.

Another aspect of some embodiments is the use of an attribute based on the capacity or capability of a product, such as price per GB. Taking into account capacities or capabilities of competing products allows for more accurate comparison and thus allows for more accurate generation of market share/size models.

Figure 7:
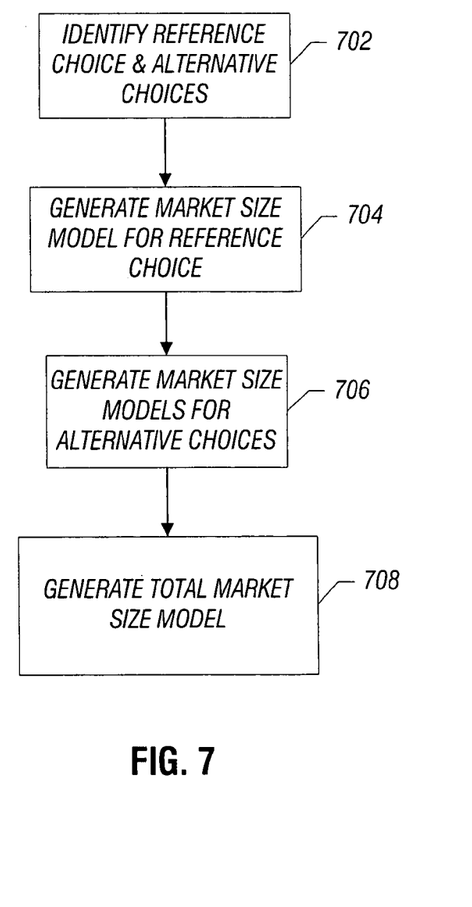
FIG. 7 is a flow diagram of a process for building market size models, in accordance with an embodiment.

FIG. 7 is a flow diagram that represents the building of market size models in more detail, in accordance with an embodiment (and more specifically, in accordance with Eqs. 2-5). The process of FIG. 7 can also be performed by the market share/market size model builder 102 of FIG. 1. The market share/market size model builder 102 first identifiers (at 702) a reference choice and alternative choices, where the reference choice represents a reference market participant and the alternative choices represent alternative market participants. As discussed above in connection with Eq. 2, once the market size model for the reference choice is determined, Eq. 2 can be used to easily generate market size models for the alternative choices.

Next, the market size model is generated for the reference choice (at 704), according to Eq. 4. The market size model for the reference choice is based on attributes associated with the reference and alternative choices and market size coefficients corresponding to the attributes for the respective reference and alternative choices. The attributes are represented by original $\vec{x}$ containing original attribute values, or by modified $\vec{x}$ containing relative attribute values calculated according to Eq. 6, for example. The market size coefficients are represented by $\vec{\gamma}$.

Next, once the market size model for the reference choice has been generated, the market size models are generated (at 706) for the alternative choices, using Eq. 2. Next, using Eq. 5, the total market size model is generated (at 708).

Instructions of software described above (including market share/size model builder 102 of FIG. 1) are loaded for execution on a processor (such as one or more CPUs 104 in FIG. 1). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method executed by a computer, comprising:
determining a trend of attributes associated with plural market participants;
computing, by the computer, a representation of the trend;
receiving original values of the attributes;
normalizing, by the computer using the representation of the trend, the original values of the attributes with respect to the trend to produce normalized values; and
building, by the computer, market models for the corresponding market participants based on the normalized values of the attributes.

2. The method of claim 1, wherein building the market models comprises building at least one of market size models and market share models.

3. The method of claim 1, wherein determining the trend comprises determining a changing trend of the attributes associated with the plural market participants, and wherein computing the representation of the trend comprises computing a representation of the changing trend.

4. The method of claim 1, wherein the representation of the trend comprises a trend parameter that varies with time; and
wherein normalizing the original values of the attributes is based on a mathematical operation involving the trend parameter.

5. The method of claim 1, wherein computing the representation of the trend comprises computing one of a mean and median of values of the attributes associated with the plural market participants.

6. The method of claim 1, wherein the market models comprise market size models, and wherein building the market size models for the market participants comprises building log-linear market size models for the market participants.

7. The method of claim 1, wherein the market models comprise market share models, and wherein building the market share models for the market participants comprises building multilogit demand models for the market participants.

8. A method executed by a computer, comprising:
   determining a trend of attributes associated with plural market participants;
   computing, by the computer, a representation of the trend; and
   building, by the computer, market models for the market participants according to the representation of the trend, wherein the market models comprise market share models, and wherein building the market share models comprises building a market share model $p_0$ for a first of the plural market participants, and building market share models, $p_k$ ($k=1$ to $K$), for others of the plural market participants, wherein $p_0$ and $p_k$ are defined as:

$$\begin{cases} p_0 = f_0(\vec{x}) = \dfrac{1}{1 + \sum_{j=1}^{K} \exp(\vec{\beta}'_j \vec{x})}, \\ p_k = f_k(\vec{x}) = \dfrac{\exp(\vec{\beta}'_k \vec{x})}{1 + \sum_{j=1}^{K} \exp(\vec{\beta}'_j \vec{x})} \text{ (for } k = 1, \ldots, K\text{)}, \end{cases}$$

wherein $\vec{\beta}'_j$ represents a vector of coefficients for market participant $j$, $j$ being a number between 1 and $K$, $K$ being a number of the others of the plural market participants, and $\vec{x}$ is a vector containing normalized values of the attributes associated with the plural market participants, wherein the normalized values of the attributes are normalized based on the trend of the attributes.

9. A method executed by a computer, comprising:
   determining a trend of attributes associated with plural market participants;
   computing, by the computer, a representation of the trend; and
   building, by the computer, market models for the market participants according to the representation of the trend, wherein the market models comprise market size models, and wherein building the market size models comprises building a market size model $D_0$ for a reference one of the plural market participants, and building market size models $D_j$ ($j=1$ to $K$) for others of the plural market participants, where $K$ represents a number of the others of the plural market participants, and where $D_0$ and $D_j$ ($j=1$ to $K$) are represented by:

$$D_0 = \exp(\gamma_{itc} + \gamma_0 x_0 + \ldots + \gamma_K x_K) = \exp(\vec{\gamma}' \vec{x})$$

$$\frac{D_j}{D_0} = \exp(\vec{\beta}'_j \vec{x}),$$

where $\gamma_{itc}$, $\gamma_0$, $\gamma_1$ to $\gamma_K$ represent market size coefficients, $\vec{\beta}'_j$ represents a vector of coefficients for market participant $j$, $j$ being a number between 1 and $K$, and $\vec{x}$ is a vector containing normalized values of the attributes associated with the plural market participants, wherein the normalized values of the attributes are normalized based on the trend of the attributes.

10. The method of claim 1, wherein determining the trend of the attributes comprises determining the trend of price per capacity attributes associated with the plural market participants.

11. The method of claim 1, wherein determining the trend of the attributes comprises determining the trend of attributes that are based on one of capacities and capabilities of the plural market participants.

12. A method executed by a computer, comprising:
   identifying a reference choice representing a reference market participant and alternative choices representing alternative market participants;
   generating, by the computer, a first market size model of the reference choice according to attributes associated with the reference choice and alternative choices and market size coefficients corresponding to the attributes for respective reference and alternative choices; and
   computing, by the computer, additional market size models for the alternative choices based at least on the first market size model and the attributes.

13. The method of claim 12, wherein computing the additional market size models is further based on market share coefficients corresponding to the attributes.

14. The method of claim 12, further comprising computing a total market size model based on the first market size model and the additional market size models.

15. The method of claim 12, wherein the first market size model is represented by $D_0$, and the additional market size models are represented as $D_j$ for $j=1$ to $K$, where $K$ represents a number of the alternative choices, and wherein $D_j$ is expressed as $D_0$ multiplied by a function.

16. The method of claim 15, wherein multiplying $D_0$ by the function comprises multiplying $D_0$ by $\exp(\vec{\beta}'_j, \vec{x})$, wherein $\vec{\beta}'_j$ represents a vector of coefficients to be applied to the attributes for choice $j$, and wherein $\vec{x}$ is a vector that contains values of the attributes that have been normalized with respect to a trend of the attributes.

17. The method of claim 13, wherein generating the first market size model of the reference choice according to the attributes comprises generating the first market size model according to attributes having values that have been normalized with respect to a trend of the attributes.

18. A computer-readable storage medium storing instructions that when executed cause a computer to:
   determine a trend of attributes associated with plural market participants;
   compute a representation of the trend;
   receive original values of the attributes;
   normalize, using the representation of the trend, the original values of the attributes with respect to the trend to produce normalized values; and build market models for the corresponding market participants based on the normalized values of the attributes.

19. The computer-readable storage medium of claim 18, wherein determining the trend comprises determining a trend that changes over time, and wherein computing the representation of the trend comprises computing the representation of the trend that changes over time.

20. The computer-readable storage medium of claim 18, wherein building the market models comprises building at least one of market size models and market share models.

21. The method of claim 1, further comprising computing the normalized values based on a difference between the corresponding original values and a value associated with the trend.

22. The computer-readable storage medium of claim 18 wherein the instructions when executed cause the computer to further compute the normalized values based on a difference between the corresponding original values and a value associated with the trend.

* * * * *